United States Patent
Fu et al.

(10) Patent No.: US 10,742,989 B2
(45) Date of Patent: Aug. 11, 2020

(54) VARIABLE FRAME RATE ENCODING METHOD AND DEVICE BASED ON A STILL AREA OR A MOTION AREA

(71) Applicant: ALLWINNER TECHNOLOGY CO., LTD., Zhuhai (CN)

(72) Inventors: Tao Fu, Zhuhai (CN); Jun Wang, Zhuhai (CN); Jiejun Li, Zhuhai (CN)

(73) Assignee: ALLWINNER TECHNOLOGY CO., LTD., Zhuhai (CN)

( * ) Notice: Subject to any disclaimer, the term of this patent is extended or adjusted under 35 U.S.C. 154(b) by 0 days.

(21) Appl. No.: 16/500,920

(22) PCT Filed: Jan. 31, 2018

(86) PCT No.: PCT/CN2018/074759
§ 371 (c)(1),
(2) Date: Oct. 4, 2019

(87) PCT Pub. No.: WO2018/184417
PCT Pub. Date: Oct. 11, 2018

(65) Prior Publication Data
US 2020/0128252 A1    Apr. 23, 2020

(30) Foreign Application Priority Data
Apr. 7, 2017 (CN) .......................... 2017 1 0223318

(51) Int. Cl.
| | | |
|---|---|---|
| *H04N 7/12* | (2006.01) |
| *H04N 19/146* | (2014.01) |
| *H04N 19/105* | (2014.01) |
| *H04N 19/176* | (2014.01) |
| *H04N 19/186* | (2014.01) |
| *H04N 19/159* | (2014.01) |

(52) U.S. Cl.
CPC ......... *H04N 19/146* (2014.11); *H04N 19/105* (2014.11); *H04N 19/159* (2014.11); *H04N 19/176* (2014.11); *H04N 19/186* (2014.11)

(58) Field of Classification Search
CPC ........................... H04N 19/137; H04N 19/186
See application file for complete search history.

(56) References Cited

U.S. PATENT DOCUMENTS
2010/0053345 A1   3/2010   Kim et al.
2016/0381368 A1   12/2016  Liao et al.

FOREIGN PATENT DOCUMENTS
| CN | 102104714 | 6/2011 |
| CN | 103430546 | 12/2013 |
| CN | 105940677 | 9/2016 |
| CN | 106993187 | 7/2017 |

OTHER PUBLICATIONS

(Journal of Data Acquisition of Processing), non-official translation (Zhao, Yao at al. The key technoiagy of the new generation video coding standard HEVC) Jan. 31, 2014; pp. 1-10.

*Primary Examiner* — Y Lee
(74) *Attorney, Agent, or Firm* — Cozen O'Connor (57) ABSTRACT

A variable frame rate encoding method applied to a video encoder, and the method, by obtaining a current coded macro block: determining whether the current coded macro block is located in a still area and if the current coded macro block is located in the still area, encoding the current coded macro block by using a first preset coding mode, and if the current coded macro block is located in a motion area, then encoding the current coded macro block by using a second preset coding mode.

4 Claims, 6 Drawing Sheets

VARIABLE FRAME RATE ENCODING METHOD AND DEVICE BASED ON A STILL AREA OR A MOTION AREA

PRIORITY CLAIM

This is a U.S. national stage of application No. PCT/CN2018/074759, filed on Jan. 31, 2018. Priority is claimed on Chinese Application No. CN201710223318.X, filed Apr. 7, 2017, the content of which is incorporated herein by reference.

TECHNICAL FIELD

The invention relates to the technical field of video encoders, in particular to a variable frame rate encoding method and a device using the same, and also relates to a computer device and a computer readable storage medium for implementing the method. The present invention is based on application number CN201710223318.X, filed on Apr. 7, 2017, the contents of which are incorporated herein by reference.

BACKGROUND OF THE INVENTION

With the wide spread of high-definition video, the specialization of video application renders higher demands for encoding. In the field of monitoring, the resolution of the video is higher and higher, and the compression rate of the video is strictly required based on the requirements of transmission bandwidth and storage, so that the improvement of the encoding quality and the compression rate of the monitored video becomes an explicit requirement. For video encoding processing, the higher the image frame rate, the higher the encoding rate is required. How to flexibly change the encoding image frame rate according to the characteristics of video image data and transmission bandwidth can effectively control the video encoding rate.

In video monitoring applications, for encoded scenes, the background is always mostly stationary while the foreground object is moving, but the foreground moving object is the area of interest. Therefore, with the characteristic of static monitoring scene background being effectively utilized, the encoding rate of the non-interested area being reduced, the video encoding compression rate can be greatly improved. In addition, in the existing variable frame rate implementation scheme, the frame rate change of the encoded frame is generally controlled from the angle of rate control, and there is no method for changing the frame rate from the angle of macro block encoding based on image content.

Technical Problem

It is a first object of the present invention to provide a variable frame rate encoding method that reduces energy consumption and improves encoding efficiency.

It is a second object of the present invention to provide a variable frame rate encoding device that reduces energy consumption and improves encoding efficiency.

It is a third object of the present invention to provide a computer device capable of implementing the above variable frame rate encoding method.

It is a fourth object of the present invention to provide a computer-readable storage medium capable of implementing the above variable frame rate encoding method.

Technical Means

In order to achieve the first object, the variable frame rate encoding method provided by the invention is applied to a video encoder, and the method comprises the following steps: obtaining a current coded macro block; determining whether the current coded macro block is located in a still area, and if the current coded macro block is located in the still area, encoding the current coded macro block by using a first preset coding mode; and if the current coded macro block is located in the motion area, encoding the current coded macro block by using a second preset coding mode.

According to a further scheme, the current coded macro block is encoded by using a first preset coding mode, and the method comprises the following steps: selecting a coding mode of a current coding macro block; and carrying out reconstruction frame processing on the current coded macro block.

According to a further scheme, selecting the coding mode of the current coded macro block comprises the following steps: setting a blocking mode of the prediction unit as a 2N×2N mode; setting the motion vector of the current coded macro block to be 0, and obtaining an optimal prediction motion vector closest to the zero vector; obtaining a Merge candidate set of a current coded macro block, and selecting a group of Merge candidates with the smallest Merge candidate index as an optimal Merge candidate; setting all quantization coefficients of luma and quantization coefficients of chroma of the current coded macro block to be 0, and setting quantization coefficient marks corresponding to the quantization coefficients of luma and chroma to be 0; The current coded macro block is placed in Merge prediction mode so that the current coded macro block is encoded to be a Skip prediction mode.

According to a further scheme, selecting the coding mode of the current coded macro block comprises the following steps: setting a blocking mode of the prediction unit as an Inter16×16 mode; setting the motion vector of the current coded macro block to be 0, and obtaining an optimal prediction motion vector closest to the zero vector; setting all quantization coefficients of luma and quantization coefficients of chroma of the current coded macro block to be 0, and setting quantization coefficient marks corresponding to the quantization coefficients of luma and chroma to be 0; and setting the current coded macro block to be a Skip prediction mode.

According to a further scheme, reconstruction frame processing is carried out on the current coded macro block, and the method comprises the following steps: copying the luma prediction block data of the current coded macro block into luma reconstruction block data; and copying the chroma prediction block data of the current coded macro block into chroma reconstruction block data.

To achieve the above second object, the present invention provides a variable frame rate encoding device applied to a video encoder, and the device comprises: a coded macro block obtaining module for obtaining a current coded macro block; an area determining module used for determining whether the current coded macro block is located in a still area; a still area coding module used for encoding the current coded macro block by using a first preset coding mode if the current coded macro block is located in the still area; and a motion area coding module used for encoding the current coded macro block by using a second preset coding mode if the current coded macro block is located in the motion area.

To achieve the above third object, the present invention provides a computer device comprising a processor and a computer-readable storage medium storing a computer program which, when read and executed by a processor, executes the above variable frame rate encoding method.

To achieve the above fourth object, the present invention provides a computer readable storage medium storing thereon a computer program which, when read and executed by a processor, executes the above variable frame rate encoding method.

Beneficial Effect Thereof

According to the variable frame rate encoding method, whether the area where the current coded macro block is located is a still area is determined, if the current coded macro block is located in the still area (i.e. the background area), a fast coding mode is adopted for encoding, and if the current coded macro block is located in the motion area, a second preset coding mode is adopted, such as a conventional coding mode of a HEVC/H.265 standard, an AVC/H.264 standard and the like, so that the encoding quality of the motion area is ensured, a conventional coding mode is adopted for encoding with respect to a whole frame image, a fast coding mode is adopted for encoding the encoding macro block of the still area, the encoding speed of the still area in the image can be accelerated, and the encoding efficiency is improved.

In addition, compared with the existing encoding method, for example, when the HEVC/H.265 standard or the AVC/H.264 standard is used for encoding processing, a whole set of processing methods of predicting, transforming, quantizing, loop filtering, entropy encoding and the like are adopted on the coded macro blocks, the coded macro blocks in the background area are encoded in a first preset coding mode, so that the processing steps can be greatly simplified, and the hardware power consumption is reduced.

In addition, when the coding mode of the current coded macro block is selected, motion estimation and blocking processing are not carried out, the calculation complexity is greatly reduced. Meanwhile, the scheme adopts HEVC/H.265 standard encoding, the blocking mode of the prediction unit is set to be a 2N×2N mode, and the coding mode is preferentially encoded to be a Merge prediction mode, so that the coded macro block can be more easily encoded to be a Skip prediction mode, and the code rate is saved. The motion vector of the current coded macro block is set to be 0, meanwhile, the quantization coefficients of the current coded macro block are guaranteed to be all 0, the number of encoded bits can be greatly reduced, and the compression rate is improved.

In addition, according to the scheme, AVC/H.264 standard encoding is applied, the blocking mode of the prediction unit is set to be an Inter16×16 mode, the motion vector of the current coded macro block is set to be 0, meanwhile, the quantization coefficients of the current coded macro block are guaranteed to be all 0, and the coded macro block can meet the requirement of entering a Skip prediction mode.

Moreover, after the motion vector of the current coded macro block is set to be 0 and the residual error is also set to be 0, the reconstructed block data and the predicted block data can be completely identical, so that the predicted block data can be directly copied to be used as the reconstructed block data of the reconstructed frame, and the encoding time is saved.

In addition, the variable frame rate encoding device disclosed by the invention ensures the encoding quality of a motion area by determining whether the area where the current coded macro block is located is a still area, if the current coded macro block is located in the still area (i.e. a background area), a fast coding mode is adopted, and if the current coded macro block is located in the motion area, a second preset coding mode is adopted, such as a HEVC/H.265 standard, an AVC/H.264 standard and the like. The coding quality of the motion area is ensured, and the second preset coding mode is used for encoding with respect to the entire frame image, and the coded macro block of the still area is coded by fast coding, which can speed up the coding speed of the still area in the image, thereby improving coding rate.

The present invention will now be further described with reference to the accompanying drawings and examples.

EMBODIMENTS OF THE PRESENT INVENTION

The variable frame rate encoding method is applied to a video encoder and used for encoding video image data received in the video encoder, different coding modes can be adopted for a still area and a motion area, encoding efficiency is high, and power consumption is reduced. It will be appreciated that the variable frame rate encoding method of the present invention is a software program executed on a processor. In addition, the computer device of the present invention includes a processor and a computer-readable storage medium, which may be a nonvolatile memory such as an EEPROM or a FLASH, on which the encoding method for realizing the variable frame rate described above is stored, and which can realize the encoding method for the variable frame rate described above when the programs are read and executed by a processor.

Figure 1:
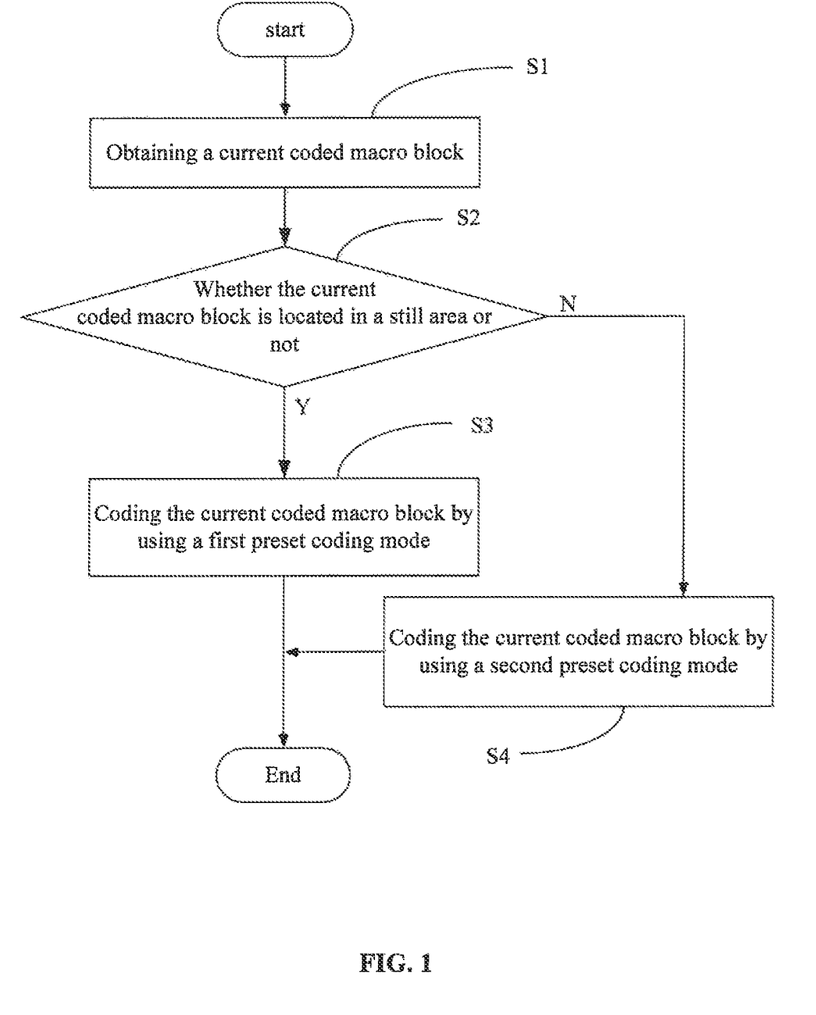
FIG. 1 is a flow chart of a first embodiment of a variable frame rate encoding method of the present invention.

The first embodiment of a variable frame rate encoding method includes:

As shown in FIG. 1, according to the variable frame rate encoding method of the present embodiment, a HEVC/H.265 standard is adopted for encoding processing. After video image data are obtained by a video encoder, when encoding is required, a step S1 is firstly executed to obtain a current coding macro block. The encoder encodes in blocks of pixels when encoding, and the current coded macro block refers to the block of pixels being encoded in the current frame image.

And after the current coded macro block is obtained, step S2 is carried out to determine whether the current coded macro block is located in a still area. A frame of image can be divided into a motion area (i.e. a foreground area) and a still area (i.e. a background area), and the division of the area can obtain the still area and the motion area of the encoded scene through the existing intelligent video analysis and identification technology. The intelligent video analysis and identification technology refers to a technology for identifying, detecting, analyzing and processing a video image picture through machine learning or intelligent analysis. In the present invention, it mainly refers to a related technique of performing position marking on moving objects in a video image picture and providing coordinates of moving regions. By determining the coordinate information of the current coded macro block, whether the current coded macro block is located in a still area can be determined.

Figure 2:
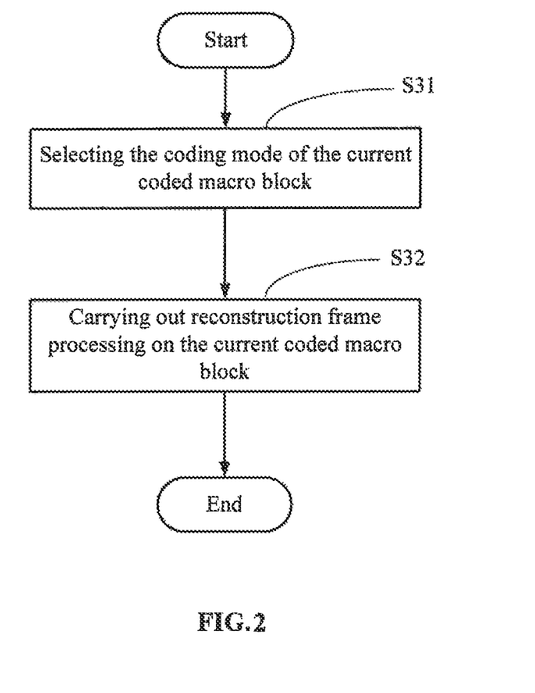
FIG. 2 is a flow chart of encoding steps for a current coded macro block using a first preset encoding scheme in a first embodiment of the variable frame rate encoding method of the present invention.

And if the current coded macro block is determined to be located in the still area, step S3 is carried out, the current coded macro block is encoded by using a first preset coding mode. Referring to FIG. 2, the step of encoding a current coded macro block using a first preset coding mode includes: step S31, selecting a coding mode of the current coded macro block; and step S32, carrying out reconstruction frame processing on the current coded macro block.

When the current coded macro block is encoded by using a first preset coding mode, a step S31 is firstly carried out, and the step comprises the following steps: a blocking mode of the prediction unit is set as a 2N×2N mode; the motion vector of the current coded macro block is set to be 0, and an optimal prediction motion vector closest to the zero vector is obtained; a Merge candidate set of a current coded macro block is obtained, and a group of Merge candidates with the smallest Merge candidate index is selected as an optimal Merge candidate; all quantization coefficients of luma and quantization coefficients of chroma of the current coded macro block is set to be 0, and quantization coefficient marks corresponding to the quantization coefficients of luma and chroma are set to be 0; the current coded macro block is placed in Merge prediction mode so that the current coded macro block is encoded to be a Skip prediction mode.

In the HEVC/H.265 standard, the block patterns of prediction units include 2N×2N, 2N×N, N×2N, N×N, 2N×nU, 2N×nD, nL×2N and nR×2N. The blocking mode of the prediction unit is set to be a 2N×2N mode, such as a 64×64 mode, a 32×32 mode, a 16×16 mode, or an 8×8 mode, allowing the current coded macro block to be preferentially encoded into a Merge prediction mode.

The motion vector of the current coded macro block is set to be 0, a prediction motion vector candidate set of the current coded macro block is obtained, and a prediction motion vector closest to a zero vector is selected as an optimal prediction motion vector according to the prediction motion vector candidate set. And when selecting the prediction motion vector closest to the zero vector, the sum of absolute differences (SAD) between the vertical component and the horizontal component of the prediction motion vector and the corresponding component of the zero vector is calculated respectively, wherein the motion vector with the smallest the sum of the absolute differences which closest to the zero vector is the optimal prediction motion vector. In the embodiment, a prediction motion vector candidate set of a current macro block is obtained according to a conventional advanced motion vector prediction technology (AMVP), namely, a spatial domain candidate list and a time domain candidate list are respectively established by utilizing the correlation of motion vectors in space and time, and an optimal prediction motion vector is selected from the candidate list.

When obtaining the Merge candidate set of the current coded macro block, the motion information of the macro block in the current prediction unit is estimated by the Merge processing technology by using the motion information of the macro block in the adjacent prediction unit through a conventional Merge processing technology (i.e. a Merge prediction mode), and the optimal motion information is selected by the encoder from the candidate set formed by the macro block of the adjacent prediction unit in the time-space domain. In this embodiment, if there is a set of candidate motion vectors equal to 0 and whose reference frame index is equal to the reference frame index of the current macro block, the set of candidate motion vectors with the smallest Merge candidate index is selected as the optimal Merge candidate.

In order to reduce the number of encoded bits and improve the compression rate, the quantization coefficient of the luma and the quantization coefficient of the chroma of the current coded macro block are all set to be 0, and the quantization coefficient marks corresponding to the quantization coefficient of the luma and the quantization coefficient of the chroma are respectively set to be 0. The residual coefficients are also all set to be 0, only a small number of prediction syntax elements are encoded, so that the processing steps of the still area macro block are greatly simplified, and the hardware power consumption is reduced.

In the HEVC/H.265 standard, if a prediction mode of a coded macro block is a Merge prediction mode, a blocking mode of a prediction unit is a 2N×2N mode, a quantization coefficient is 0, and a current coding mode is not a lossless coding mode, the prediction mode of the coded macro block is set to be a Skip prediction mode. Therefore, setting the current coded macro block to the Merge prediction mode may facilitate the encoding of the current coded macro block to the Skip prediction mode.

After the coding mode of the current coded macro block is selected, step S32 is carried out for reconstruction frame processing on the current coded macro block. Step S32 comprises the following steps: the luma prediction block data of the current coded macro block are copied into luma reconstruction block data; the chroma prediction block data of the current coded macro block are copied into the chroma reconstruction block data.

When the motion vector of the current coded macro block is set to be 0, the reconstruction block data and the prediction block data are completely identical when the current frame video image is reconstructed. Therefore, the luma prediction block data and the chroma prediction block data of the current coded macro block can be copied into the reconstructed block data, thereby ending the data processing of the current coded macro block.

When step S2 is carried out to determine whether the current coded macro block is located in the still area, if the current coded macro block is determined to be located in the motion area, step S4 is carried out, and the current coded macro block is encoded by using a second preset coding mode. In the embodiment, the second preset coding mode is an encoding processing method which carries out the steps of prediction, transformation, quantization, loop filtering, entropy encoding and the like on a coded macro block, so that the encoding quality of a motion area can be guaranteed.

Figure 3:
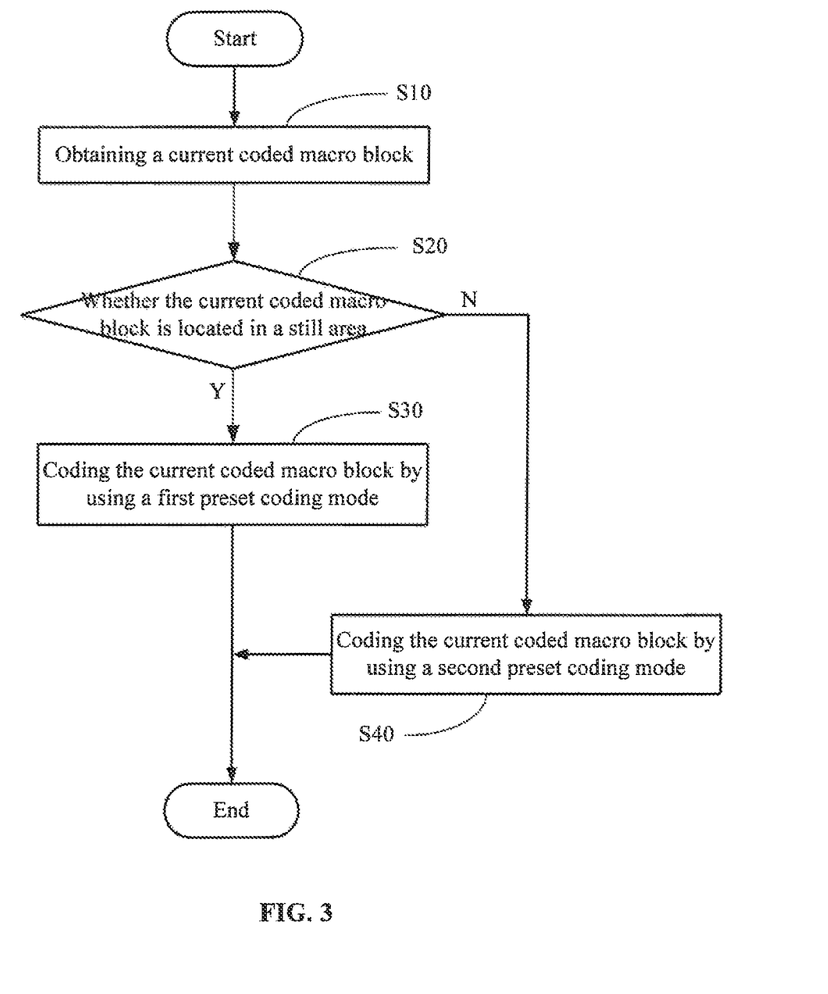
FIG. 3 is a flow chart of a second embodiment of the variable frame rate encoding method of the present invention.

The second embodiment of the encoding method of the variable frame rate comprises the following steps:

As shown in FIG. 3, in the present embodiment, an AVC/H.264 standard is applied to the variable frame rate encoding method of the present invention for encoding. After the video image data are obtained by the video encoder, when encoding is required, a step S10 is firstly carried out to obtain a current coding macro block. The encoder encodes in blocks of pixels when encoding, and the current coded macro block refers to the block of pixels being encoded in the current frame image.

After the current coded macro block is obtained, step S20 is carried out to determine whether the current coded macro block is located in a still area. A frame of an image may be divided into a motion area (i.e., a foreground area) and a still area (i.e., a background area). The still area and the motion area of the encoded scene can be obtained from the area division through the existing intelligent video analysis and identification technology. The intelligent video analysis and identification technology refers to a technology for identifying, detecting, analyzing and processing a video image picture through machine learning or intelligent analysis. In the present invention, it mainly refers to a related technique of performing position marking on moving objects in a video image picture and providing coordinates of moving regions. By determining the coordinate information of the current coded macro block, whether the current coded macro block is located in a still area can be determined.

Figure 4:
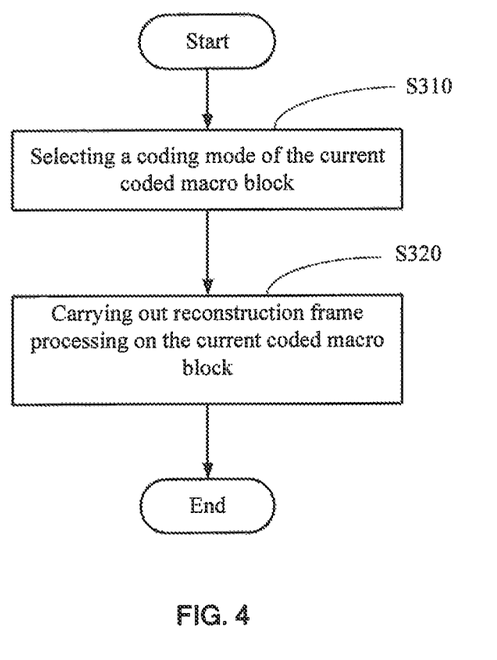
FIG. 4 is a flowchart of a step of encoding a current coded macro block using a first preset encoding method in a second embodiment of the variable frame rate encoding method of the present invention.

If the current coded macro block is determined to be located in the still area, step S30 is carried out, and the current coded macro block is encoded by using a first preset coding mode. Referring to FIG. 4, the step of encoding a current coded macro block using a first preset coding mode includes: step S310, a coding mode of the current coded macro block is selected; and step S320, reconstruction frame processing is carried out on the current coded macro block.

When the current coded macro block is encoded by using a first preset coding mode, a step S310 is firstly carried out, and the step comprises the following steps: the blocking mode of the prediction unit is set to be an Inter 16×16 mode; the motion vector of the current coded macro block is set to be 0, and an optimal prediction motion vector closest to the zero vector is obtained; all quantization coefficients of luma and quantization coefficients of chroma of the current coded macro block are set to be 0, and quantization coefficient marks corresponding to the quantization coefficients of luma and chroma are set to be 0; and the current coded macro block are set to be a Skip prediction mode.

Unlike the HEVC/H.265 standard, there is no advanced motion vector prediction technique (AMVP) in the AVC/H.264 standard, so it is necessary to replace it with the conventional prediction motion vector (PMV) method, for example, the processing method in the AVC official test model (JM) can be used. And when selecting the prediction motion vector closest to the zero vector, the sum of absolute differences (SAD) between the vertical component and the horizontal component of the prediction motion vector and the corresponding component of the zero vector is calculated respectively, wherein the motion vector with the smallest the sum of the absolute differences which closest to the zero vector is the optimal prediction motion vector. In addition, the conventional Merge processing technique does not exist in the AVC/H.264 standard, and therefore, encoding according to an inter prediction mode in the AVC/H.264 standard is required.

In the AVC/H.264 standard, if a prediction mode of a coded macro block is an inter prediction mode, a block mode of a prediction unit is an Inter 16×16 mode, a motion vector of the coded macro block is set to be 0, and a reference frame index of a current coded macro block is set to be 0, the prediction mode of the coded macro block is set to be a Skip prediction mode.

After the coding mode of the current coded macro block is selected, step S320 is carried out for reconstruction frame processing on the current coded macro block. Step S320 comprises the following steps: the luma prediction block data of the current coded macro block are copied into luma reconstruction block data; the chroma prediction block data of the current coded macro block are copied into the chroma reconstruction block data.

When the motion vector of the current coded macro block is set to be 0, the reconstruction block data and the prediction block data are completely identical when the current frame video image is reconstructed. Therefore, the luma prediction block data and the chroma prediction block data of the current coded macro block can be copied into the reconstructed block data, thereby ending the data processing of the current coded macro block.

When step S20 is carried out, whether the current coded macro block is located in the still area is determined, and if the current coded macro block is determined to be located in the motion area, step S40 is carried out, and the current coded macro block is encoded by using a second preset coding mode. In this embodiment, the second preset coding mode is an encoding processing method which carries out the steps of prediction, transformation, quantization, loop filtering, entropy encoding and the like on a coded macro block, so that the encoding quality of a motion area can be guaranteed.

Figure 5:
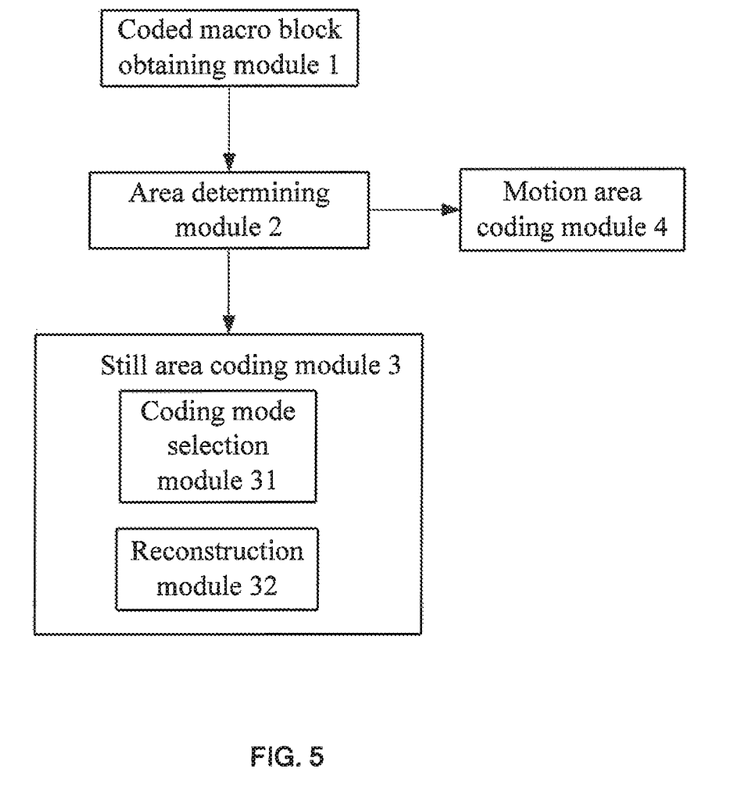
FIG. 5 is a block diagram of a first embodiment of a variable frame rate encoding device of the present invention.

The first embodiment of a variable frame rate encoding device includes:

As shown in FIG. 5, in the present embodiment, the variable frame rate encoding device includes a coded macro block obtaining module 1, an area determining module 2, a still area coding module 3, and a motion area coding module 4.

The coded macro block obtaining module 1 is used for obtaining a current coded macro block. A video encoder encodes in blocks of pixels when encoding, and a current coded macro block refers to a block of pixels being encoded in a current frame image.

The area determining module 2 is used for determining whether the current coded macro block is located in a still area. A frame of image can be divided into a motion area (i.e. a foreground area) and a still area (i.e. a background area), and the division of the area can obtain the still area and the motion area of the encoded scene through the existing intelligent video analysis and identification technology. The intelligent video analysis and identification technology refers to a technology for identifying, detecting, analyzing and processing a video image picture through machine learning or intelligent analysis. In the present invention, it mainly refers to a related technique of performing position marking on moving objects in a video image picture and providing coordinates of moving regions. By determining the coordinate information of the current coded macro block, whether the current coded macro block is located in a still area can be determined.

And the still area coding module 3 is used for encoding the current coded macro block by using a first preset coding mode if the current coded macro block is determined to be located in the still area. Wherein, the still area coding module 3 comprises a coding mode selection module 31 and a reconstruction module 32.

The coding mode selection module 31 is used for selecting the coding mode of the current coded macro block. A coding mode of a current coded macro block is selected by the coding mode selection module 31, comprising: a blocking mode of a prediction unit is set into a 2N×2N mode, such as a 64×64 mode, a 32×32 mode, a 16×16 mode or an 8×8 mode, and an optimal prediction motion vector closest to a zero vector is obtained; the motion vector of the current coded macro block is set to be 0; a Merge candidate set of a current coded macro block is obtained, and a group of Merge candidates with the smallest Merge candidate index is selected as an optimal Merge candidate; all quantization coefficients of luma and quantization coefficients of chroma of the current coded macro block are set to be 0, and quantization coefficient marks corresponding to the quantization coefficients of luma and chroma are set to be 0; the current coded macro block is placed in Merge prediction mode so that the current coded macro block is encoded to be a Skip prediction mode.

The motion vector of the current coded macro block is set to be 0, a prediction motion vector candidate set of the current coded macro block is obtained, and a prediction motion vector closest to a zero vector is selected as an optimal prediction motion vector according to the prediction motion vector candidate set. And when selecting the prediction motion vector closest to the zero vector, the sum of absolute differences (SAD) between the vertical component and the horizontal component of the prediction motion vector and the corresponding component of the zero vector is calculated respectively, wherein the motion vector with the smallest the sum of the absolute differences which closest to the zero vector is the optimal prediction motion vector. In this embodiment, a prediction motion vector candidate set of a current macro block is obtained according to a conventional advanced motion vector prediction technology (AMVP), namely, a spatial domain candidate list and a time domain candidate list are respectively established by utilizing the correlation of motion vectors in space and time, and an optimal prediction motion vector is selected from the candidate list.

When obtaining the Merge candidate set of the current coded macro block, the motion information of the macro block in the current prediction unit is estimated by the Merge processing technology by using the motion information of the macro block in the adjacent prediction unit through a conventional Merge processing technology (i.e. a Merge prediction mode), and the optimal motion information is selected by the encoder from the candidate set formed by the macro block of the adjacent prediction unit in the time-space domain. In this embodiment, if there is a set of candidate motion vectors equal to 0 and whose reference frame index is equal to the reference frame index of the current macro block, the set of candidate motion vectors with the smallest Merge candidate index is selected as the optimal Merge candidate.

The quantization coefficient of the luma and the quantization coefficient of the chroma of the current coded macro block are all set to be 0, and the quantization coefficient marks corresponding to the quantization coefficient of the luma and the quantization coefficient of the chroma are respectively set to be 0. The residual coefficients are also all set to be 0, only a small number of prediction syntax elements are encoded, so that the processing steps of the still area macro block are greatly simplified, and the hardware power consumption is reduced.

The reconstruction module 32 is used for reconstruction frame processing on the current coded macro block. The reconstruction module 32 carries out reconstruction frame processing on the current coded macro block, including: the luma prediction block data of the current coded macro block are copied into luma reconstruction block data; and the chroma prediction block data of the current coded macro block are copied into the chroma reconstruction block data.

And the motion area coding module 4 is used for encoding the current coded macro block by using a second preset coding mode if the current coded macro block is determined to be located in the motion area. In this embodiment, the second preset coding mode is an encoding processing method which carries out the steps of prediction, transformation, quantization, loop filtering, entropy encoding and the like on a coded macro block, so that the encoding quality of a motion area can be guaranteed.

Figure 6:
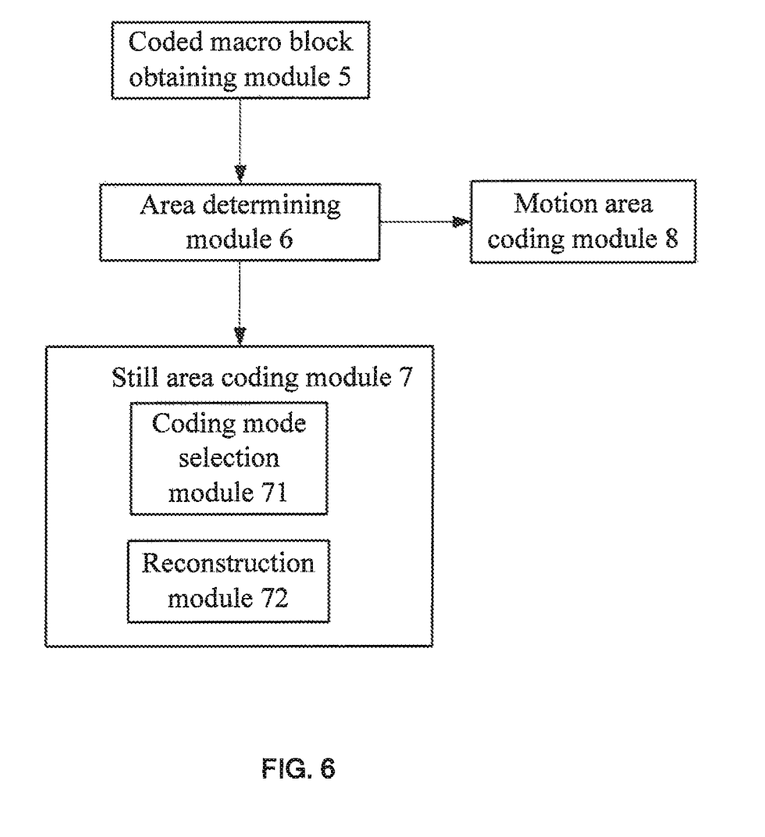
FIG. 6 is a block diagram of a second embodiment of a variable frame rate encoding device of the present invention.

The second embodiment of the variable frame rate encoding device comprises:

As shown in FIG. 6, in the present embodiment, the variable frame rate encoding device includes a coded macro block obtaining module 5, an area determining module 6, a still area coding module 7, and a motion area coding module 8.

The coded macro block obtaining module 5 is used for obtaining the current coded macro block. A video encoder encodes in blocks of pixels when encoding, and a current coded macro block refers to a block of pixels being encoded in a current frame image.

The area determining module 6 is used for determining whether the current coded macro block is located in a still area. A frame of image can be divided into a motion area (i.e. a foreground area) and a still area (i.e. a background area), and the division of the area can obtain the still area and the motion area of the encoded scene through the existing intelligent video analysis and identification technology. The intelligent video analysis and identification technology refers to a technology for identifying, detecting, analyzing and processing a video image picture through machine learning or intelligent analysis. In the present invention, it mainly refers to a related technique of performing position marking on moving objects in a video image picture and providing coordinates of moving regions. By determining the coordinate information of the current coded macro block, whether the current coded macro block is located in a still area can be determined.

The still area coding module 7 is used for encoding the current coded macro block by using a first preset coding mode if the current coded macro block is determined to be located in the still area. Wherein, the still area coding module 7 comprises a coding mode selection module 71 and a reconstruction module 72.

The coding mode selection module 71 is used to select the coding mode of the current coded macro block. A coding mode of a current coded macro block is selected by the coding mode selection module 71, including: a blocking mode of the prediction unit is set as an Inter 16×16 mode; the motion vector of the current coded macro block is set to be 0, and an optimal prediction motion vector closest to the zero vector is obtained; all quantization coefficients of luma and quantization coefficients of chroma of the current coded macro block are set to be 0, and quantization coefficient marks corresponding to the quantization coefficients of luma and chroma are set to be 0; and the current coded macro block is set to be a Skip prediction mode.

Unlike the HEVC/H.265 standard, there is no advanced motion vector prediction technique (AMVP) in the AVC/H.264 standard, so it is necessary to replace it with the conventional prediction motion vector (PMV), for example, the processing method in the AVC official test model (JM) can be used. And when selecting the prediction motion vector closest to the zero vector, the sum of absolute differences (SAD) between the vertical component and the horizontal component of the prediction motion vector and the corresponding component of the zero vector is calculated respectively, wherein the motion vector with the smallest the sum of the absolute differences which closest to the zero vector is the optimal prediction motion vector. In addition, the conventional Merge processing technique does not exist in the AVC/H.264 standard, and therefore, encoding according to an inter prediction mode in the AVC/H.264 standard is required.

In the AVC/H.264 standard, if a prediction mode of a coded macro block is an inter prediction mode, a block mode of a prediction unit is an Inter 16×16 mode, a motion vector of the coded macro block is set to be 0, and a reference frame index of a current coded macro block is set to be 0, the prediction mode of the coded macro block is set to be a Skip prediction mode.

A reconstruction module 72 is used for reconstruction frame processing on the current coded macro block. The reconstruction module 72 carries out reconstruction frame processing on the current coded macro block, including: the luma prediction block data of the current coded macro block are copied into luma reconstruction block data; the chroma prediction block data of the current coded macro block are copied into the chroma reconstruction block data.

And the motion area coding module 8 is used for encoding the current coded macro block by using a second preset coding mode if the current coded macro block is determined to be located in the motion area. In this embodiment, the second preset coding mode is an encoding processing method which carries out the steps of prediction, transformation, quantization, loop filtering, entropy encoding and the like on a coded macro block, so that the encoding quality of a motion area can be guaranteed.

It can be seen from the above that by determining whether the area where the current coded macro block is located is a still area, if the current coded macro block is located in the still area (i.e. the background area), the method adopts a fast coding mode for encoding, and if the current coded macro block is located in the motion area, a second preset coding mode is adopted, such as a conventional coding mode of the HEVC/H.265 standard, the AVC/H.264 standard and the like, so that the encoding quality of the motion area can be guaranteed, a conventional coding mode is adopted for encoding with respect to a whole frame image, a fast coding mode is adopted for encoding the encoding macro block of the still area, the encoding speed of the still area in the image can be accelerated, and the encoding efficiency is improved.

An embodiment of computer device:

The computer device provided by the invention can be an electronic device capable of playing audio and video, such as a smart phone, a tablet computer and the like, and comprises a power supply, a memory and a processor, and a computer program stored in the memory and capable of running on the processor. The processor implements the steps of the variable frame rate encoding method described above when executing a computer program.

The processor referred to in this embodiment may be a central processing unit, but may be other general purpose processors, digital signal processors, application specific integrated circuits, field programmable gate array or other programmable logic devices, discrete gate or transistor logic devices, discrete hardware components, etc. A general purpose processor may be a microprocessor or the processor may be any conventional processor or the like, and the processor is the control center of a computer device and connects various portions of the entire computer device using various interfaces and lines.

The memory may be used to store computer programs and/or modules, and the processor may implement various functions of the terminal device by running or executing the computer programs and/or modules stored in the memory and invoking data stored in the memory. The memory mainly comprises a storage program area and a storage data area, wherein the storage program area can store an operating system, an application program required by at least one function and the like; the storage data area may store data created according to the use of the handset, etc.

Furthermore, the functional units in the embodiments of the invention may be integrated in one processing unit, may be physically separate units, or may be integrated in one unit in two or more units. The integrated units described above can be implemented either in hardware or in software functional units.

An embodiment of computer-readable storage medium:

In this embodiment, the computer-readable storage medium stores a computer program, i.e., the computer program is stored in a computer-readable storage medium including instructions for causing a computer device (which may be a personal computer, a server, or a network device, etc.) to carry out all or part of the steps of the methods of the various embodiments of the present invention. The above storage medium includes: U disk, removable hard disk, read-only memory, random-access memory, magnetic or optical disk, and various media on which program code can be stored.

It is to be understood that the foregoing is only a preferred embodiment of the present invention, and that the inventive concept is not limited thereto, but that insubstantial modifications thereof are intended to fall within the scope of the present invention.

INDUSTRIAL APPLICABILITY

The variable frame rate encoding method disclosed by the invention can be applied to electronic equipment with audio and video playing functions such as a tablet computer, a smart phone or a desktop computer, a driving recorder and the like, in particular to electronic equipment needing to encode and decode audio and video. According to the variable frame rate encoding method, whether the area where the current coded macro block is located is a still area is determined, when the current coded macro block is located in the still area, the encoding is carried out in a fast coding mode, and when the current coded macro block is located in the motion area, a second preset coding mode is adopted, such as a conventional coding mode of the HEVC/H.265 standard, the AVC/H.264 standard and the like, so that the encoding quality of the motion area can be guaranteed.

Compared with the method that the whole frame image is encoded by adopting a conventional coding mode, the method provided by the invention encodes the coded macro blocks of the still area by adopting a fast coding mode, so that the encoding speed of the still area in the image can be accelerated, and the encoding efficiency is improved. Therefore, by applying the method, the energy consumption of the electronic equipment can be reduced, and the encoding efficiency can be improved.

The invention claimed is:

1. A variable frame rate encoding method applied to a video encoder, comprising the following steps:
    obtaining a current coded macro block;
    determining whether the current coded macro block is located in a still area or a motion area;

if the current coded macro block is located in the still area, then
    encoding the current coded macro block by using a first preset coding mode;
    selecting a coding mode of the current coding macro block;
    carrying out reconstruction frame processing on the current coded macro block;
    wherein selecting a coding mode of the current coding macro block comprises:
    setting the block mode of the prediction unit as a 2N×2N mode or an Inter 16×16 mode;
    if setting the block mode of the prediction unit as a 2N×2N mode, then setting the motion vector of the current coded macro block to be 0, and obtaining an optimal prediction motion vector closest to the zero vector;
    obtaining a Merge candidate set of the current coded macro block, and selecting a group of Merge candidates with the smallest Merge candidate index as an optimal Merge candidate;
    setting all quantization coefficients of luma and quantization coefficients of chroma of the current coded macro block to be 0, and setting quantization coefficient marks corresponding to the quantization coefficients of luma and chroma to be 0; and setting the current coded macro block into a Merge prediction mode, so that the current coded macro block being encoded to be a Skip prediction mode;
    if setting the block mode of the prediction unit as an Inter 16×16 mode, then setting the motion vector of the current coded macro block to be 0, and obtaining an optimal prediction motion vector closest to the zero vector;
    setting all quantization coefficients of luma and quantization coefficients of chroma of the current coded macro block to be 0, and setting quantization coefficient marks corresponding to the quantization coefficients of luma and chroma to be 0; and
    setting the current coded macro block to be a Skip prediction mode;
    wherein the reconstruction frame processing on the current coded macro block comprises:
        copying the luma prediction block data of the current coded macro block into luma reconstruction block data;
        and copying the chroma prediction block data of the current coded macro block into chroma reconstruction block data; and
if the current coded macro block is located in the motion area, then
    encoding the current coded macro block by using a second preset coding mode.

2. A variable frame rate encoding device applied to a video encoder, comprising:
a coded macro block obtaining module for obtaining a current coded macro block;
an area determining module used for determining whether the current coded macro block is located in a still area (referred to as a still area coded macro block) or a motion area (referred to as a motion area coded macro block);
a still area coding module used for encoding the current still area coded macro block by using a first preset coding mode; the still area coding module comprises a coding mode selection module for selecting a coding mode of the current still area coding macro block; and a reconstruction module used for carrying out reconstruction frame processing on the current still area coded macro block, wherein the coding mode selection module selects a coding mode of the current still area coded macro block by setting the block mode of the prediction unit as a 2N×2N mode or an Inter 16×16 mode; if setting the block mode of the prediction unit as a 2N×2N mode, then setting the motion vector of the current still area coded macro block to be 0, and obtaining an optimal prediction motion vector closest to the zero vector; obtaining a Merge candidate set of the current still area coded macro block, and selecting a group of Merge candidates with the smallest Merge candidate index as an optimal Merge candidate; setting all quantization coefficients of luma and quantization coefficients of chroma of the current still area coded macro block to be 0, and setting quantization coefficient marks corresponding to the quantization coefficients of luma and chroma to be 0; and setting the current still area coded macro block into a Merge prediction mode, so that the current still area coded macro block is encoded to be a Skip prediction mode; if setting the block mode of the prediction unit as an Inter 16×16 mode, then setting the motion vector of the current coded macro block to be 0, and obtaining an optimal prediction motion vector closest to the zero vector; setting all quantization coefficients of luma and quantization coefficients of chroma of the current coded macro block to be 0, and setting quantization coefficient marks corresponding to the quantization coefficients of luma and chroma to be 0; and setting the current coded macro block to be a Skip prediction mode;
wherein the reconstruction module carrying out reconstruction frame processing on the current still area coded macro block comprises copying the luma prediction block data of the current still area coded macro block into luma reconstruction block data; and copying the chroma prediction block data of the current still area coded macro block into chroma reconstruction block data; and
a motion area coding module used for encoding the current coded macro block by using a second preset coding mode if the current coded macro block is the motion area coded macro block.

3. A computer device comprising a processor and a computer-readable storage medium storing a computer program, wherein the processor, when reading and executing the computer program, executes the variable frame rate encoding method of claim 1.

4. A computer readable storage medium storing thereon a computer program which, when read and executed by a processor, executes the variable frame rate encoding method of claim 1.

* * * * *